(12) United States Patent
Ehrhart (10) Patent No.: US 7,958,034 B2
(45) Date of Patent: Jun. 7, 2011

(54) METHOD OF PROVIDING CATASTROPHIC LOSS PROTECTION THROUGH A MORTGAGE

(75) Inventor: Bryon Gerard Ehrhart, Chicago, IL (US)

(73) Assignee: Aon Benfield Global, Inc., Chicago, IL (US)

( * ) Notice: Subject to any disclaimer, the term of this patent is extended or adjusted under 35 U.S.C. 154(b) by 560 days.

(21) Appl. No.: 11/904,987

(22) Filed: Sep. 28, 2007

(65) Prior Publication Data

US 2009/0089221 A1   Apr. 2, 2009

(51) Int. Cl.
  *G06Q 40/00*   (2006.01)
(52) U.S. Cl. .......................................... 705/35; 705/38
(58) Field of Classification Search ............... 705/4, 35, 705/38
See application file for complete search history.

(56) References Cited

U.S. PATENT DOCUMENTS

| | | | |
|---|---|---|---|
| 2001/0034607 A1 | 10/2001 | Perschbacher et al. | 705/1 |
| 2002/0147670 A1 | 10/2002 | Lange | 705/35 |
| 2003/0009355 A1 | 1/2003 | Gupta | 705/2 |
| 2004/0128170 A1 | 7/2004 | MacKethan et al. | 705/4 |
| 2005/0108064 A1 | 5/2005 | Castleman et al. | |
| 2005/0192963 A1 | 9/2005 | Tschiegg et al. | 707/9 |
| 2006/0282356 A1 | 12/2006 | Andres et al. | 705/35 |
| 2007/0203759 A1 | 8/2007 | Mathai et al. | |
| 2007/0214023 A1 | 9/2007 | Mathai et al. | |

*Primary Examiner* — James P Trammell
(74) *Attorney, Agent, or Firm* — Marshall, Gerstein & Borun LLP

(57) ABSTRACT

A catastrophic hazard protection (CHP) mortgage may be provided on real property or structure(s) on the real property of a owner. The CHP mortgage may be structured to include financial protection in the event that one or more structures of the real property is damaged by a catastrophe such as a hurricane or earthquake. The owner may pay an increased interest rate on the CHP mortgage. If catastrophe damage occurs, the principal amount of the CHP mortgage may be reduced by the lesser of the value of the damage or the principal balance. Alternatively, the owner may receive a payment equivalent to the lesser of the value of the damage or the principal balance. A CHP mortgage may be implemented electronically. Additionally, catastrophic hazard protection may be added onto an existing mortgage.

18 Claims, 9 Drawing Sheets

FIG. 1

Fig. 2
Sample Mortgage Amortization

| | | |
|---|---|---|
| Initial building value | 200,000.00 | |
| Initial hazard expected losses | 200.00 | |
| Initial hazard rate | 285.71 | |
| Term hazard margin | 30.00% | |

| Month | Payment Date | Beginning Principal | Payment | 6.00% Interest | Interim Principal | Hazard Interest | Ending Principal | Forward 12 months Interest | Rolling APR | Replacement Value | Insurance Needed |
|---|---|---|---|---|---|---|---|---|---|---|---|
| | 7/1/2007 | 400,000.00 | | | | | | | | 200,000.00 | |
| 1 | 8/1/2007 | | 2,768.98 | 2,000.00 | 399,231.02 | 287.38 | 399,518.40 | 27,402 | 6.90% | 201,166.67 | - |
| 2 | 9/1/2007 | | 2,768.98 | 1,997.59 | 398,747.00 | 289.06 | 399,036.06 | 27,393 | 6.91% | 202,340.14 | - |
| 3 | 10/1/2007 | | 2,768.98 | 1,995.18 | 398,262.26 | 290.74 | 398,553.00 | 27,385 | 6.92% | 203,520.46 | - |
| 4 | 11/1/2007 | | 2,768.98 | 1,992.77 | 397,776.78 | 292.44 | 398,069.22 | 27,377 | 6.92% | 204,707.66 | - |
| 5 | 12/1/2007 | | 2,768.98 | 1,990.35 | 397,290.58 | 294.15 | 397,584.73 | 27,369 | 6.93% | 205,901.79 | - |
| 6 | 1/1/2008 | | 2,768.98 | 1,987.92 | 396,803.67 | 295.86 | 397,099.53 | 27,361 | 6.94% | 207,102.88 | - |
| 7 | 2/1/2008 | | 2,768.98 | 1,985.50 | 396,316.04 | 297.59 | 396,613.63 | 27,353 | 6.94% | 208,310.98 | - |
| 8 | 3/1/2008 | | 2,768.98 | 1,983.07 | 395,827.71 | 299.32 | 396,127.03 | 27,345 | 6.95% | 209,526.13 | - |
| 9 | 4/1/2008 | | 2,768.98 | 1,980.64 | 395,338.68 | 301.07 | 395,639.75 | 27,337 | 6.96% | 210,748.36 | - |
| 10 | 5/1/2008 | | 2,768.98 | 1,978.20 | 394,848.97 | 302.83 | 395,151.79 | 27,329 | 6.96% | 211,977.73 | - |
| 11 | 6/1/2008 | | 2,768.98 | 1,975.76 | 394,358.57 | 304.59 | 394,663.16 | 27,322 | 6.97% | 213,214.27 | - |
| 12 | 7/1/2008 | | 2,768.98 | 1,973.32 | 393,867.49 | 306.37 | 394,173.86 | 27,314 | 6.98% | 214,458.02 | - |
| 93 | 4/1/2015 | | 2,768.98 | 1,768.43 | 352,685.29 | 490.74 | 353,176.03 | 27,019 | 7.71% | 343,518.58 | - |
| 94 | 5/1/2015 | | 2,768.98 | 1,765.88 | 352,172.92 | 493.60 | 352,666.53 | 26,992 | 7.72% | 345,522.44 | - |
| 95 | 6/1/2015 | | 2,768.98 | 1,763.33 | 351,660.88 | 496.48 | 352,157.36 | 26,961 | 7.72% | 347,537.99 | - |
| 96 | 7/1/2015 | | 2,768.98 | 1,760.79 | 351,149.16 | 499.38 | 351,648.54 | 26,927 | 7.72% | 349,565.29 | - |
| 97 | 8/1/2015 | | 2,768.98 | 1,758.24 | 350,637.80 | 500.91 | 351,138.71 | 26,889 | 7.72% | 351,604.42 | 465.71 |
| 98 | 9/1/2015 | | 2,768.98 | 1,755.69 | 350,125.42 | 500.18 | 350,625.60 | 26,848 | 7.72% | 353,655.45 | 3,029.85 |
| 99 | 10/1/2015 | | 2,768.98 | 1,753.13 | 349,609.74 | 499.44 | 350,109.18 | 26,807 | 7.72% | 355,718.44 | 5,609.26 |
| 100 | 11/1/2015 | | 2,768.98 | 1,750.55 | 349,090.74 | 498.70 | 349,589.44 | 26,765 | 7.72% | 357,793.46 | 8,204.02 |
| 354 | 1/1/2037 | | 2,768.98 | 94.60 | 16,246.01 | 23.21 | 16,269.22 | | | 1,567,626.19 | 1,551,356.97 |
| 355 | 2/1/2037 | | 2,768.98 | 81.35 | 13,581.58 | 19.40 | 13,600.98 | | | 1,576,770.67 | 1,563,169.69 |
| 356 | 3/1/2037 | | 2,768.98 | 68.00 | 10,900.00 | 15.57 | 10,915.57 | | | 1,585,968.50 | 1,575,052.93 |
| 357 | 4/1/2037 | | 2,768.98 | 54.58 | 8,201.17 | 11.72 | 8,212.88 | | | 1,595,219.98 | 1,587,007.10 |
| 358 | 5/1/2037 | | 2,768.98 | 41.06 | 5,484.96 | 7.84 | 5,492.80 | | | 1,604,525.43 | 1,599,032.63 |
| 359 | 6/1/2037 | | 2,768.98 | 27.46 | 2,751.28 | 3.93 | 2,755.21 | | | 1,613,885.16 | 1,611,129.96 |
| 360 | 7/1/2037 | | 2,768.98 | 13.78 | (0.00) | (0.00) | (0.00) | | | 1,623,299.50 | 1,623,299.50 |

|  | Example 1 (402) | Catastrophe Losses (408, 410) | | | Fire Loss (405) |
|---|---|---|---|---|---|
|  | | Example 2 | Example 3 | Example 4 (412) | Example 1 |
| Mortgage loan | 400,000 | 100,000 | 300,000 | 300,000 | 400,000 |
| Building value | 200,000 | 300,000 | 300,000 | 300,000 | 200,000 |
| Catastrophe loss | 50,000 | 250,000 | 250,000 | 300,000 | - |
| Fire loss | 350,000 | - | 50,000 | - | 100,000 |
| Post-loss loan balance | - | 150,000 | - | - | 400,000 |
| Homeowner loss[1] | 50,000 | 100,000 | 250,000 | 300,000 | - |
| ABS investor loss | | | | | - |

(1) Assumes no homeowner retention or participation in loss scenarios
(2) Assumes homeowner maintains fire insurance on the home

METHOD OF PROVIDING CATASTROPHIC LOSS PROTECTION THROUGH A MORTGAGE

FIELD OF THE DISCLOSURE

The disclosure generally relates to a system for and method of providing catastrophic loss protection for a property via a catastrophic hazard protection mortgage.

BACKGROUND

The ability to obtain catastrophe loss or catastrophe hazard insurance protection for real property is a significant issue, especially in locations that are prone to natural disasters. Examples of locations with higher risk of catastrophic hazard occurrence include the earthquake-prone state of California and the south-eastern United States situated in the hurricane belt. Property owners in these areas may have difficulty securing catastrophe insurance, and in many cases this may also translate to difficulty in securing non-catastrophe hazard insurance (such as fire and flood insurance). There may be situations in years to come where, due to rising oceans or other waters from "global warming," that properties on neighboring areas will not be able to get flood insurance. If a catastrophe such as an earthquake, flood, or hurricane does damage an owner's real property, an owner is faced with an unattractive array of financial choices ranging from defaulting on the property's mortgage to taking out another loan to rebuild, in addition to paying the existing mortgage.

Insurance companies and mortgage lenders are also impacted by this situation. A broad market of potential customers is not being fully served due to the risk of catastrophe in their areas. Holding catastrophe hazard risk as an insurer or a bank is speculative, especially for properties in areas with higher risk.

A need exists to provide catastrophe hazard insurance to property owners in areas with higher risk of catastrophe in a manner that benefits property owners and that is not unduly risky to insurers/lenders.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A catastrophic hazard protection (CHP) mortgage may be provided on real property of a owner. The CHP mortgage may be structured to include financial protection in the event that one or more structures on the real property are damaged by a catastrophe such as a hurricane, flood, or earthquake. The owner may pay an increased interest rate on the CHP mortgage for the financial protection. If catastrophe damage occurs, the principal amount of the CHP mortgage may be reduced by the lesser of the value of the damage or the principal balance. Alternatively, the owner may receive a payment equivalent to the lesser of the value of the damage or the principal balance.

A method of providing a catastrophic hazard protection mortgage may include receiving a CHP mortgage application and data from the owner with typical mortgage industry application data such as owner financial information, real property identification, amount of loan, and the like. Catastrophe hazard risk data may be obtained for the real property or for the one or more structures on the real property for which the owner wishes to have catastrophe hazard protection. The catastrophe hazard risk data may include parameters such as structure type, structure replacement cost, structure address, structure square footage, building cost inflation index, and a measure of owner risk retention. Other data may also be obtained. The catastrophe hazard risk data may be obtained through calculations, a software tool, a third party, or through other channels.

Next, the catastrophe hazard risk data and the CHP mortgage application data may be used to determine a set of catastrophic hazard protection mortgage terms. These terms may include typical mortgage terms such as base interest rate, amortization period, and the like. The mortgage may be fixed or variable rate, balloon, adjustable rate mortgage or other types of mortgage structures. Additional terms corresponding to the CHP may be included, such as an incremental hazard interest rate corresponding to the catastrophe hazard risk and a catastrophic hazard protection clause. The incremental hazard interest rate may be a fixed or variable rate, it may change corresponding to length of amortization, principal balance, replacement value of the property, or other parameters and/or combinations of parameters. The variability of the hazard interest rate may allow flexibility in structuring a CHP mortgage product to appeal to varied target markets and/or to respond to changes in the business environment. For example, owners in later years of the amortization period who have paid down a significant portion of the mortgage may be attracted to a lower hazard interest rate in the later years of amortization, or the hazard interest rate may correspond to significant shifts in replacement value due to building material cost changes.

The catastrophic hazard protection clause may be an agreement to provide the owner with either a reduction in principal or a payment if a catastrophic hazard occurs resulting in damage to the covered structure(s) on the real property. The dollar amount of financial protection may be equivalent to the lesser of the value of damage and the principal balance. A hedging strategy may be created to mitigate the financial risk associated with the catastrophic hazard protection clause. Reinsurance or coinsurance may be secured, or other hedging strategies or combinations of strategies may be used.

Notification that the owner has been approved may be generated or received, and the owner may review and agree to the terms. The catastrophic hazard protection mortgage may then be enacted in accordance with the terms by disbursing the loan amount to a seller, financial institution, or other party designated by the owner, by setting up and receiving payments over the amortization period, and by taking other such standard steps typically associated with implementing a mortgage. However, for a CHP mortgage, when payments are received, not only may portions be allocated towards the principal and the base interest as in standard mortgages, but a portion may also be allocated towards the incremental hazard interest.

If a catastrophic hazard occurs resulting in damage to the real property or to a covered structure on the real property, information may be received regarding the value of damage. The catastrophic hazard protection clause of the CHP mortgage may then be followed, and the lesser amount of the value of damage and the principal balance may be either subtracted from the principal balance or paid to the owner. If the owner carries a non-catastrophe hazard insurance policy on the structure, the insurance policy may take precedence over the catastrophic hazard protection or be handled on a "co-pay" basis. The owner may be offered a loan to aid in rebuilding in light of the revised principal balance or payment.

The catastrophic hazard protection mortgage may be provided by a bank, a mortgage lender, an insurance company, or other business entities. Alternatively, two or more of these business entities may agree to jointly provide the CHP mortgage. The steps for providing the CHP mortgage, the profits, and the risk of the CHP mortgage may be shared across business entities. Furthermore, the catastrophic hazard protection mortgage or a portion of it may be securitized by one or more asset-backed security investors.

The CHP mortgage may be implemented electronically. An electronic CHP mortgage implementation may include creating an owner account at a network computer or other computer to administrate the steps of the CHP mortgage. Information received and generated such as risk and application data, terms, payments, value of damage and other mortgage-related information may be recorded and associated with the electronic owner account. A secure website interface and/or email communication may be provided for the owner to interact with the CHP mortgage owner account: the owner may apply for the CHP mortgage and receive approval electronically, the owner may make payments electronically, and the owner may view the status of the account electronically. Other electronic CHP mortgage uses for the website and/or email may also be possible.

Additionally, an agent may be used to interface with the owner. Any steps requiring owner communication may be performed by an agent, such as receiving mortgage application data, receiving notification of owner approval, providing the set of terms, and receiving the owner agreement. In an electronic implementation, an agent may also administer secure website permissions and email access to the owner account for the owner. Other agent responsibilities may also be possible.

Catastrophic hazard protection may also be implemented as an add-on to an existing mortgage of a property. The add-on CHP product may serve different markets than the catastrophic hazard protection mortgage product, such as owners who have been dropped from catastrophic hazard insurance policies or who have never had catastrophic hazard protection for their property, or for areas where the chance for new hazards have come into existence since the original mortgage was issued.

The method of adding on catastrophic hazard protection to an existing mortgage is similar to that of creating a CHP mortgage "from scratch". The owner may provide CHP application data including the existing mortgage's terms, catastrophe hazard risk data may be obtained, and a catastrophic hazard risk cost may be determined or obtained. A set of terms may be determined that may include an incremental hazard interest rate and a catastrophic hazard protection clause. However, for an add-on CHP, the terms may also include a hazard amortization period. The hazard amortization period may or may not be the same length as the amortization period of the existing mortgage.

The remaining steps of the CHP add-on are similar to those summarized above for a catastrophic hazard protection mortgage. A CHP add-on may be implemented by the holder of the existing mortgage, by one or more other business entities, or by some combination of the parties.

BRIEF DESCRIPTION OF THE DRAWINGS

FIG. 2 depicts an example of a catastrophic hazard protection mortgage amortization.

DETAILED DESCRIPTION

Although the following text sets forth a detailed description of numerous different embodiments, it should be understood that the legal scope of the disclosure is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
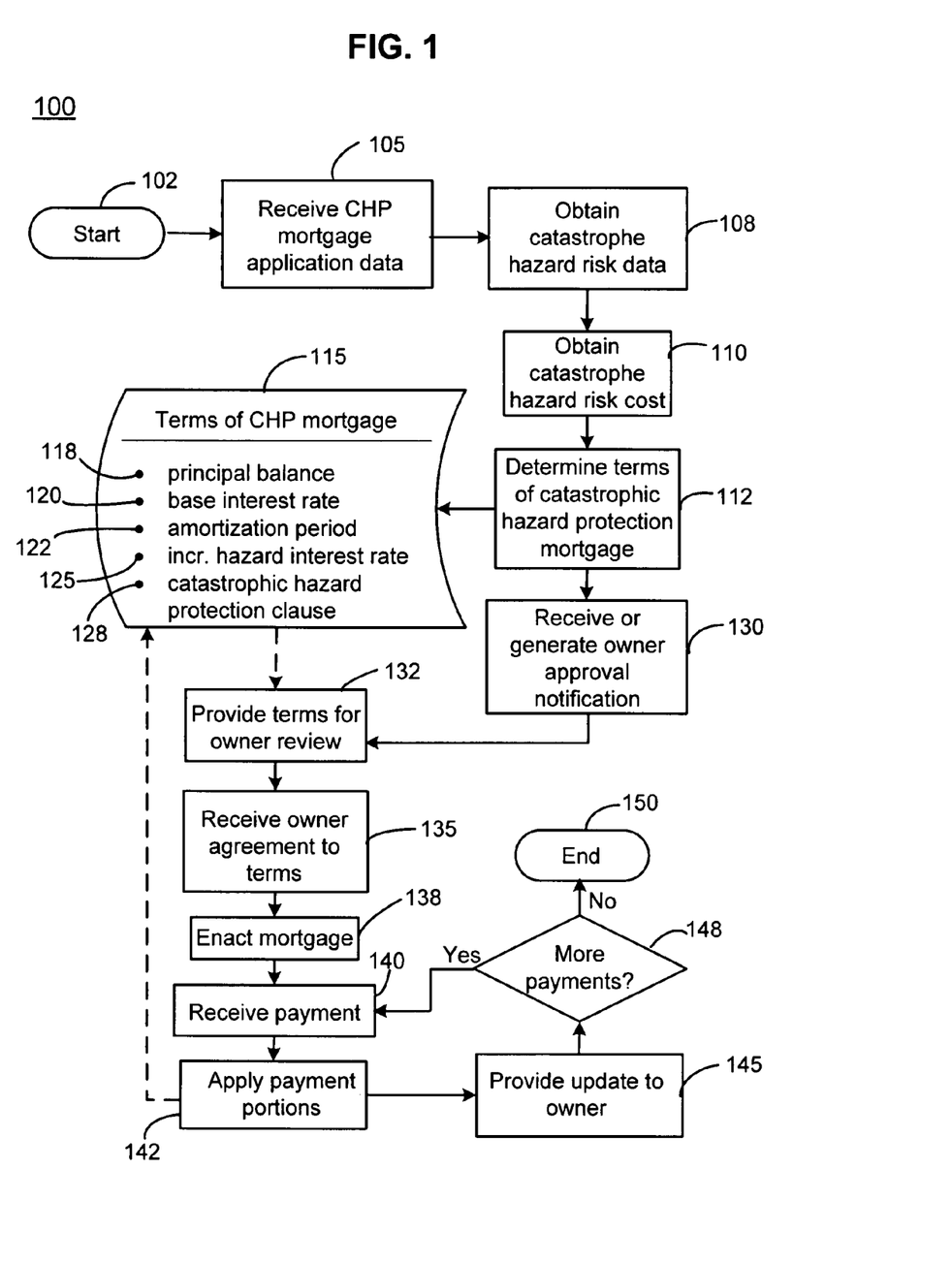
FIG. 1 is an exemplary method for providing catastrophic loss protection through a catastrophic hazard protection mortgage.

FIG. 1 illustrates an exemplary embodiment of a method 100 for providing catastrophic loss protection through a catastrophic hazard protection (CHP) mortgage on a real property of an owner. The real property may be commercial or it may be residential, and may consist of land and one or more structures. At the start (block 102), mortgage application data may be received (block 105) that may include information typically used in the art to underwrite mortgages, such as the owner's financial data, a loan amount, a loan period and a loan type. Other mortgage application data may also be received. Next, catastrophe risk data may be obtained (block 108) corresponding to the property. The catastrophe risk data may apply to the one or more structures on the property, and may include the structure type, replacement cost, address, year built, square footage, construction type, a building cost inflation index, and a measure of owner risk retention in loss scenarios. Other catastrophe risk data in addition to these parameters may also be obtained.

A catastrophe hazard risk cost of the property may be obtained (block 110). A catastrophe hazard risk cost may be a quantification of an assessment or a projection of the risk cost over a time period for a property, the determination of which may be based upon location, probability of catastrophe hazard occurrence in that location, the catastrophe risk data for the structure, as well as other factors. The catastrophe hazard risk cost may be obtained 110 via calculation, from another entity, or by some other means.

The mortgage application data and the catastrophe hazard risk cost may be used to determine a set of terms for the catastrophic hazard protection mortgage (block 112). The terms of the mortgage 115 may include mortgage-industry terms used in the art such as but not limited to a principal balance 118, base interest rate 120, and amortization period 122. The mortgage terms 115 may cover a fixed-rate, variable-rate, ARM, balloon, or other mortgage implementations.

In addition to terms 115 that are typically used in the standard mortgage industry, other terms 115 that correspond to the catastrophe hazard may also be determined (block 112). An incremental hazard interest rate 125 may be included in the terms 115. The level of the incremental hazard interest rate 125 may be set corresponding to the catastrophe hazard risk cost and may be implemented as a supplemental increase on the base interest rate 125. Alternatively, the incremental hazard interest rate 125 may correspond to the replacement value of the property. The rate 125 may be fixed or variable. Variability of the hazard rate may be based upon well-known mortgage-industry parameters, for example, prime interest rate fluctuations, length of time in an ARM, etc. Variability may also be based upon loss-protection parameters, such as but not limited to fluctuations in the catastrophe hazard risk cost, changes in the replacement value of the property, remaining amount of the principal balance 118, and how many years in the life of the amortization period 122 have passed. The variability of the incremental hazard rate may be based upon any combination of standard mortgage-industry and loss-protection parameters to enable flexibility in configuring the CHP mortgage product to different markets.

Another term 115 of the catastrophic hazard protection mortgage may be the catastrophic hazard protection clause 128. This clause 128 may be an agreement to provide the owner with some financial protection if a catastrophic hazard occurs resulting in damage to the real property, typically to the one or more structures on the property. One available option for financial protection may be a reduction in the principal balance 118 by the financial amount of the damage. Another option may include retaining the principal balance but providing a payout to the owner in the amount of the financial damage. Other options may be possible.

Notification that the owner has been approved for the CHP mortgage in accordance with the terms 115 may be received (block 130), and the terms 115 may be provided to the owner for review (block 132). An owner agreement may be received (block 135), and the catastrophic hazard protection mortgage may then be enacted (block 138) by disbursing the principal loan amount, receiving points and fees, allowing payments to be received, accounting for the payments, and other such standard steps known in the art that are necessary to enable a standard mortgage agreement. However, when a catastrophic hazard protection mortgage payment is received from the owner (block 140), portions of the payment are applied (block 142) not only toward the principal balance 118 and the base interest rate 120, but also toward the incremental hazard interest rate 125. The transaction may be recorded and an update may be provided (block 145) to the owner. Throughout the lifetime of the amortization period 122, if the CHP mortgage has not been paid off, as determined at block 148, payments from the owner may continue to be received (block 140) and applied (block 142) toward the principal balance 118, base interest 120, and incremental hazard interest 125. When the CHP mortgage has been fulfilled as determined at block 148, the method may end (block 150).

The catastrophic hazard protection mortgage may be securitized with one or more asset-backed security (ABS) investors. One ABS investor may securitize the catastrophic hazard risk cost, and the same or another ABS may securitize the base mortgage. Other divisions of securitizing across investors may be possible. The ABS investor(s) may create a hedging strategy to mitigate the increased financial risk corresponding to the catastrophic hazard protection, such as securing reinsurance or coinsurance, or other hedging strategies.

The steps of the exemplary method 100 illustrated by FIG. 1 may be performed by a single business entity, such as but not limited to a mortgage broker, a bank, a mortgage licensee, or an insurance company. The steps may also be performed by more than one business entity in a joint business arrangement where the profits may be shared or where one entity may pay another entity a fee for each mortgage agreement, for each step of the method performed by the other entity, or per period of time. Other divisions of steps and of compensation arrangements between business entities may also be possible.

The method 100 of FIG. 1 may also be implemented using an agent to interface with the owner. As used herein, the term "agent" is intended to be interpreted in its broadest sense and to include all types of agents, brokers, or other business partners. An agent may perform steps that require an owner interaction, such as receiving the mortgage application data, notifying the owner of mortgage approval, creating a package of terms and forms required, receiving the owner agreement, and providing updates to the owner. Other steps or portions of steps in the exemplary method may also be performed by the agent.

FIG. 2 illustrates a sample catastrophic hazard protection mortgage amortization schedule. In this example, both the base and hazard interest rates are fixed over the amortization period. The customer payments are applied across the base interest, the principal amounts, and the hazard interest. The catastrophe hazard protection applies to the building or structure value, and corresponds to the replacement value of the building, as projected across the amortization schedule. Such protection would not apply, for example, to ongoing business operations, crops, timber, and other business asset property. Needed protection is equal to the projected replacement value of the building or structure value.

Figure 3:
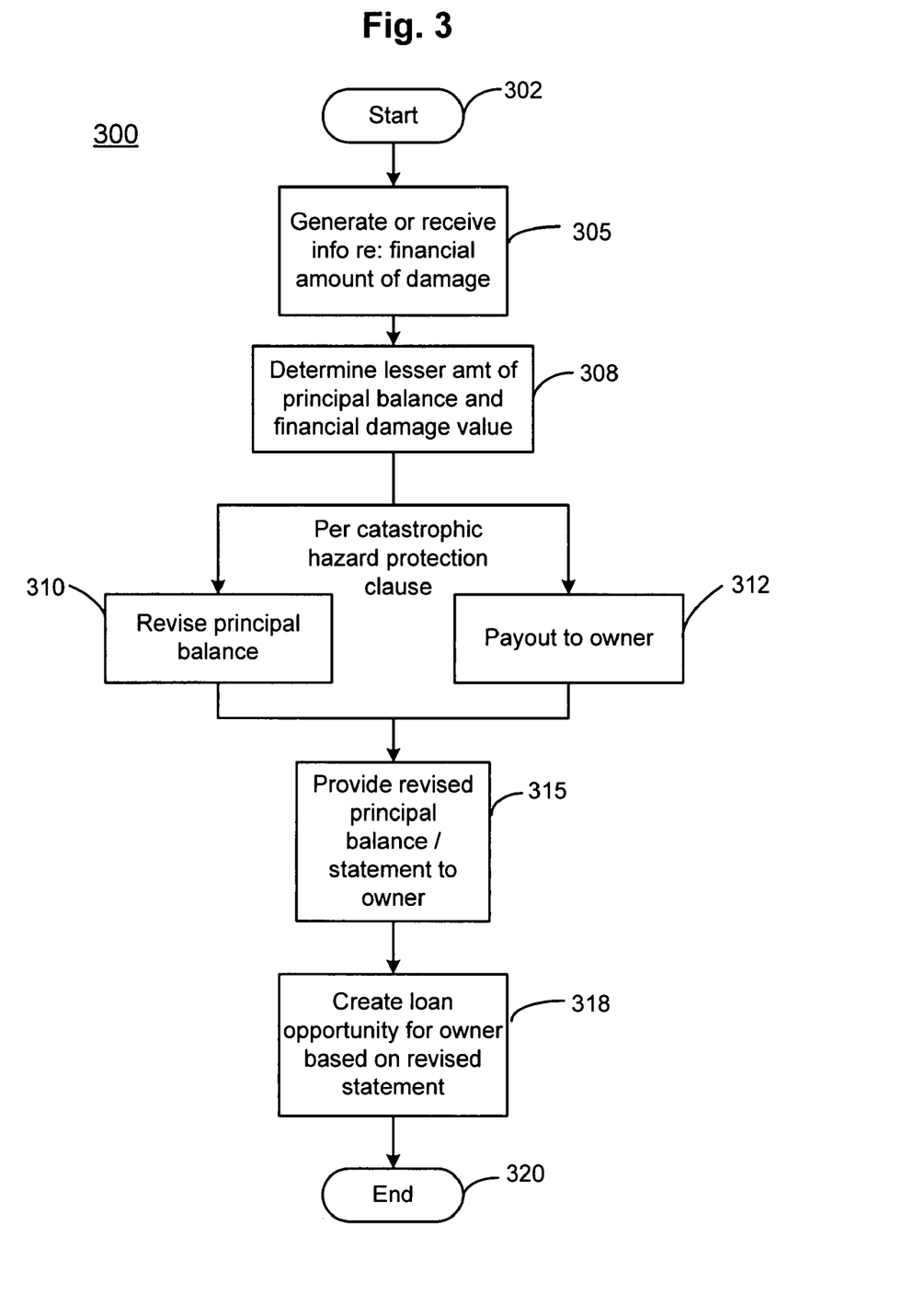
FIG. 3 illustrates the method of FIG. 1 after the occurrence of a catastrophic hazard.

FIG. 3 illustrates an exemplary embodiment of a method 300 for providing catastrophic loss protection through a catastrophic hazard protection mortgage when a catastrophic hazard occurs resulting in damage to the real property of the owner. At the start (block 302), the financial amount of the damage may be received (block 305). The financial amount of damage may correspond to the covered loss damage to one or more structures on the real property of the owner. The lesser amount of the financial amount of damage and the principal balance 118 may be determined (block 308). Catastrophic loss protection may occur according to the catastrophic hazard protection clause 128 of the CHP mortgage: the principal balance 118 may be decreased (block 310) or the owner may receive a payout (block 312). A revised principal balance 118 and statement may be provided (block 315) to the owner, and the owner may be offered a loan (block 318) in light of the revised principal balance 118 and/or payout to provide funds for repairing at least a portion of the damage. The method may then end (block 320).

If the owner carries a current non-catastrophe hazard insurance policy for the property, such as but not limited to fire insurance or flood insurance, the non-catastrophe insurance policy terms may be invoked before the catastrophic hazard protection clause of the mortgage.

Additionally, the exemplary method 300 may be implemented with an agent performing any steps or portions of steps of the method 300 that require an interface to the owner.

Figure 4:
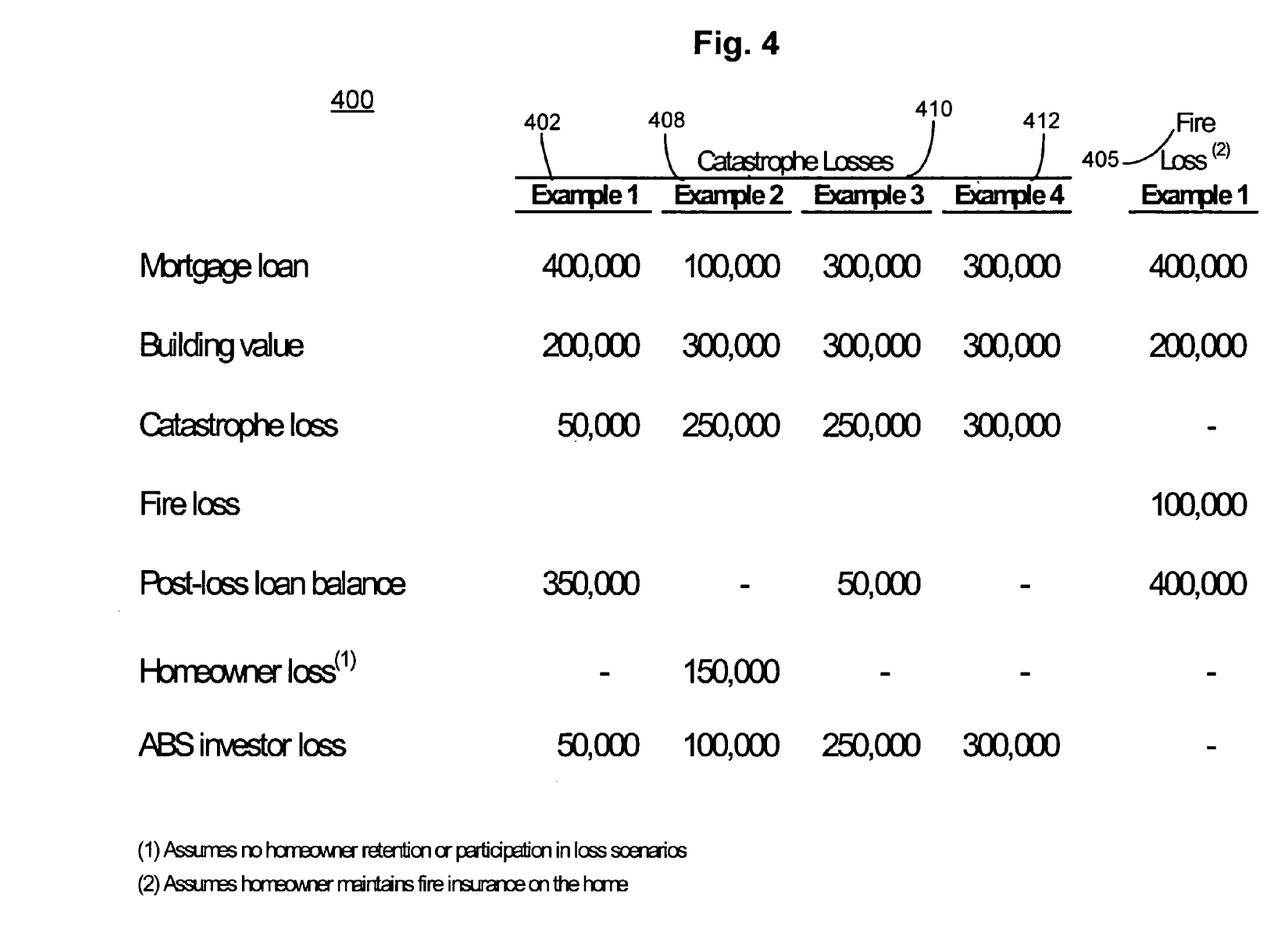
FIG. 4 illustrates possible implementations of the exemplary method through several scenarios.

FIG. 4 shows several examples 400 of how the catastrophic hazard protection mortgage may be implemented. In example 1 (402), a CHP mortgage of $400,000 may be taken out on a property of which the building value is $200,000. After a catastrophe occurs, the covered damage loss may be valued at $50,000. The owner may choose to reduce the principal balance by $50,000, resulting an updated principal balance of $350,000. The investor may thus incur a loss of $50,000. The owner may continue to make payments on the CHP mortgage with a principal balance of $350,000 in accordance with the terms.

In another example (405), if the property and mortgage of example 1 incurs a $100,000 loss due to a fire and the owner carries fire insurance, the fire insurance policy may take precedence. In this scenario, the catastrophic hazard protection may not be invoked, and the principal balance may remain unchanged.

Example 2 (408) illustrates a situation that may happen in the latter part of an amortization schedule. At the time of the catastrophe occurrence, the CHP mortgage principal balance of $100,000 may be less than the building value of $300,000. The damage may be valued at $250,000. Per the terms of the catastrophic hazard protection clause, the principal may be reduced by the lesser amount of the principal balance and the financial damage—in this example, $100,000. The owner may absorb the $150,000 remainder of the loss, and the investor may incur a $100,000 loss due to the principal reduction. The catastrophic hazard protection mortgage may cease to exist since the principal balance is zero.

Example 3 (410) shows a scenario in which the principal balance and the value of the building are equivalent, in this case $300,000. Such a scenario may occur during the mid-life of an amortization schedule, after the building value may have had time to appreciate and the principal balance may have been partially paid down. A catastrophic loss resulting in an estimated $250,000 loss may occur. The principal may be reduced by $250,000, thus resulting in an investor loss of $250,000. The owner may still have a remaining principal balance of $50,000 on the CHP mortgage. The owner may continue to periodically make payments according to the terms of the amortization schedule.

Example 4 (412) shows a similar scenario in which the principal balance and the value of the building are equivalent, in this case $300,000. However, in this example a catastrophic loss of $300,000 may be absorbed entirely by the investor. The amount of damage may be deducted from the principal balance resulting in a zero balance for the owner, and the catastrophic hazard protection mortgage may cease to exist.

Figure 5:
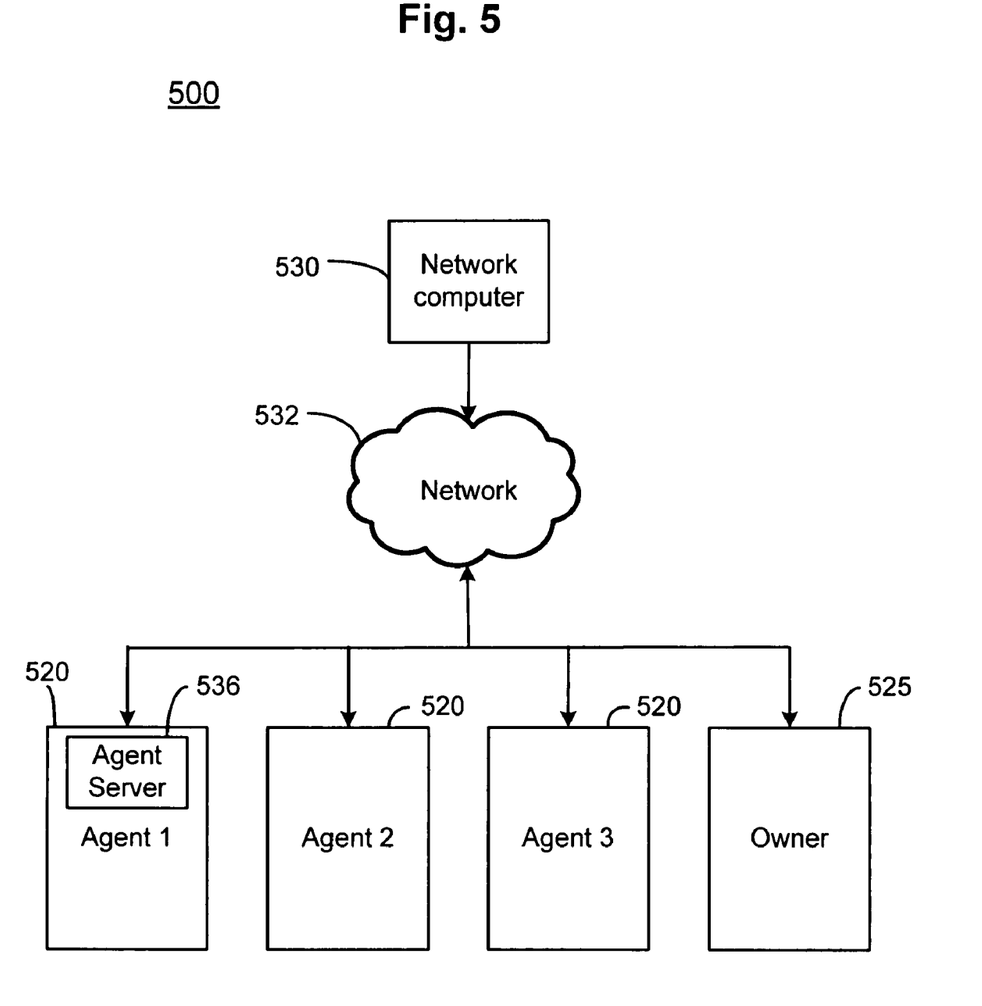
FIG. 5 is an exemplary architectural embodiment for electronically providing catastrophic loss protection through a catastrophic hazard protection mortgage.

Providing catastrophic hazard protection via a mortgage may also be implemented using an electronic embodiment. FIG. 5 illustrates an embodiment of a data network 500 including a first group of agents 520 operatively coupled to a network computer 530 via a network 532. The plurality of agents 520 may be located, by way of example rather than limitation, in separate geographic locations from each other, in different areas of the same city, or in different states. The network 532 may be provided using a wide variety of techniques well known to those skilled in the art for the transfer of electronic data. For example, the network 532 may comprise dedicated access lines, plain ordinary telephone lines, satellite links, wireless networks, combinations of these, etc. Additionally, the network 532 may include a plurality of network computers or server computers (not shown), each of which may be operatively interconnected in a known manner. Where the network 532 comprises the Internet, data communication may take place over the network 532 via an Internet communication protocol.

The network computer 530 may be a server computer of the type commonly employed in networking solutions. The network computer 530 may be used to accumulate, analyze, and download data corresponding to catastrophic hazard protection mortgages. For example, the network computer 530 may periodically receive mortgage application data from each of the agents 520, or directly from the owner 525 via a website interface. Updated statements may be provided from the network computer 530 to the agents 520 or to the owner 525 via email or website access. The agents 520 may utilize at their offices one or more agent servers 536 that may be utilized to store information for a plurality of owners associated with each agent.

Although the data network 500 is shown to include one network computer 530, three agents 520 and one owner 525, it should be understood that different numbers of computers and agents may be utilized. For example, the network 532 may include a plurality of network computers 530 and hundreds of agents 520, all of which may be interconnected via the network 532. Or, in another example, multiple owners may directly access the network 532 to access the network computer 530 through a secured means. According to the disclosed example, this configuration may provide several advantages, such as, for example, enabling near real time uploads and downloads of information as well as periodic uploads and downloads of information. This provides for a primary backup of all the information generated in the process of updating and accumulating catastrophic hazard protection data.

FIG. 5 also illustrates how an owner 525 may directly access the data network 510. The owner 525 may be using a computer similar to a client device terminal and may be directly coupled to the network 532 or, alternatively, may be using a client device terminal coupled to an agent server 536. The owner 525 may utilize a computer that includes a display 596, a controller 597, a keyboard 598 as well as a variety of other input/output devices such as a scanner, credit card reader, printer, mouse, touch screen, track pad, track ball, isopoint, voice recognition system, digital camera, electronic storage device reader (e.g., flash drive interface or magnetic media reader), etc.

Figure 5A:
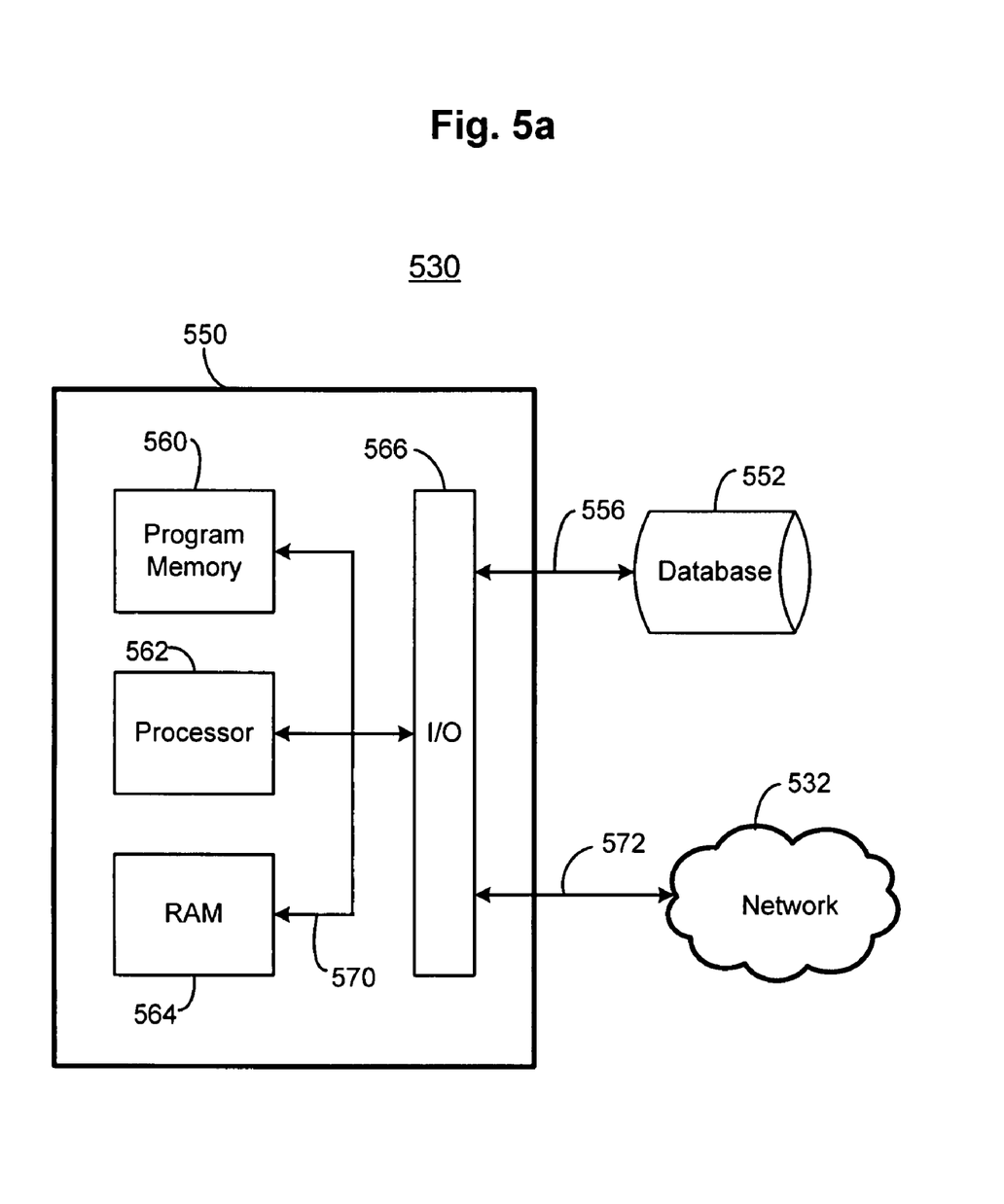
FIG. 5a is a schematic diagram of one possible embodiment of the network computer shown in FIG. 5.

FIG. 5a is a schematic diagram of one possible embodiment of the network computer 530 shown in FIG. 5. The network computer 530 may have a controller 550 that is operatively connected to a database 552 via a link 556. It should be noted that, while not shown, additional databases may be linked to the controller 550 in a known manner.

The controller 550 may include a program memory 560, a processor 562 (may be called a microcontroller or a microprocessor), a random-access memory (RAM) 564, and an input/output (I/O) circuit 566, all of which may be interconnected via an address/data bus 570. It should be appreciated that although only one microprocessor 562 is shown, the controller 550 may include multiple microprocessors 562. Similarly, the memory of the controller 550 may include multiple RAMs 564 and multiple program memories 560. Although the I/O circuit 566 is shown as a single block, it should be appreciated that the I/O circuit 566 may include a number of different types of I/O circuits. The RAM(s) 564 and programs memories 560 may be implemented as semiconductor memories, magnetically readable memories, and/or optically readable memories, for example. All of these memories or data repositories may be referred to as machine-accessible storage mediums. The controller 550 may also be operatively connected to the network 532 via a link 572.

For the purpose of this description and as briefly discussed above, a machine-accessible storage medium includes any mechanism that provides information in a form accessible by a machine (e.g., a computer, network device, personal digital assistant, manufacturing tool, any device with a set of one or more processors). For example, a machine-accessible storage medium includes recordable/non-recordable media (e.g., read only memory (ROM); random access memory (RAM); magnetic disk storage media; optical storage media; flash memory devices).

Figure 5B:
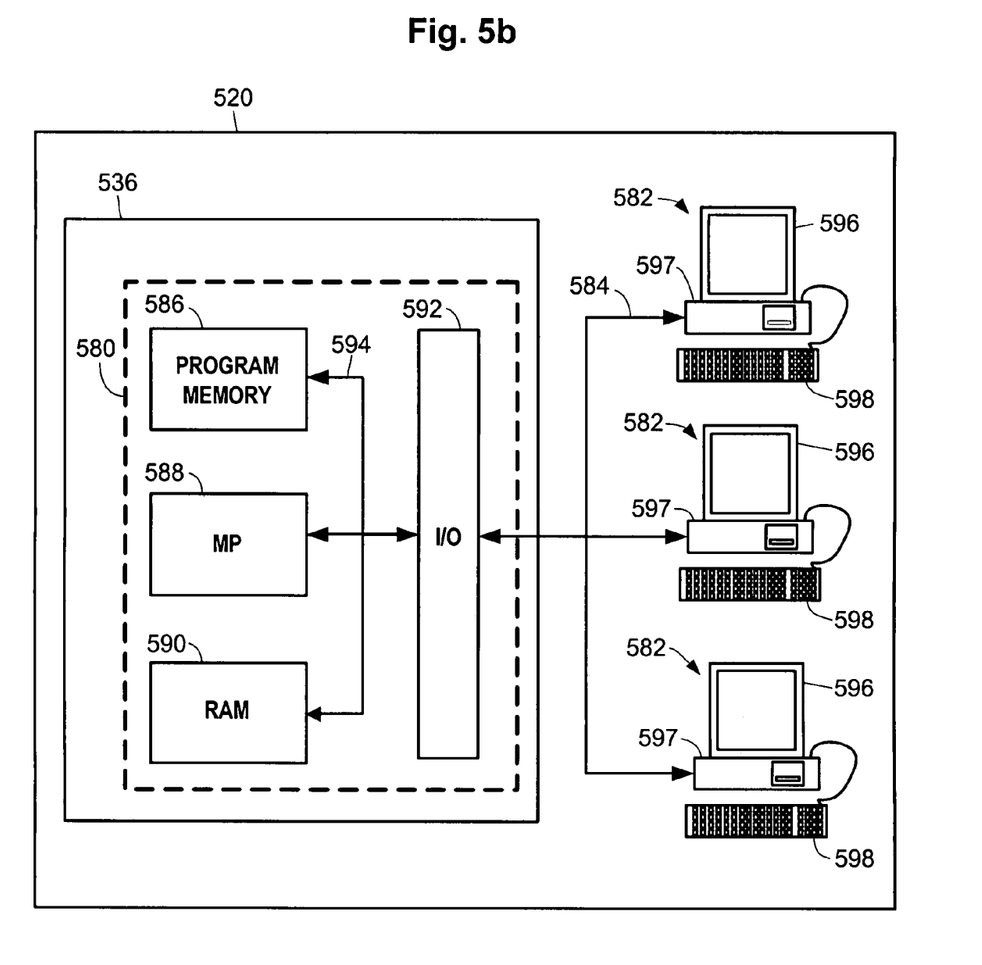
FIG. 5b is a schematic diagram of one possible embodiment of several components located at one or more of the agents' businesses from FIG. 5.

FIG. 5b is a schematic diagram of one possible embodiment of several components located at one or more of the agents' businesses 520 from FIG. 5. Although the following description addresses the design of the agents' businesses 520, it should be understood that the design of one or more of the agent's business 520 may be different than the design of other agent's business 520. Also, each agent 520 may have various different structures and methods of operation. It should also be understood that the embodiment shown in FIG. 5b illustrates some of the components and data connections present in an agent's business, however it does not illustrate all of the data connections present in a typical business. For exemplary purposes, one design of an agent's business is described below, but it should be understood that numerous other designs may be utilized.

The agent 520 may have an agent server 536, which includes a controller 580, wherein the agent server 536 is operatively connected to a plurality of client device terminals 582 via a network 584. The network 584 may be a wide area network (WAN), a local area network (LAN), or any other type of network readily known to those persons skilled in the art. The client device terminals 582 may also be operatively connected to the network computer 530 from FIG. 5 via the network 532.

Similar to the controller 550 from FIG. 5a, the controller 580 may include a program memory 586, a microcontroller or a microprocessor (MP) 588, a random-access memory (RAM) 590, and an input/output (I/O) circuit 592, all of which may be interconnected via an address/data bus 594. As discussed with reference to the controller 550, it should be appreciated that although only one microprocessor 588 is shown, the controller 580 may include multiple microprocessors 588. Similarly, the memory of the controller 580 may include multiple RAMs 590 and multiple programs memories 586. Although the I/O circuit 592 is shown as a single block, the I/O circuit 592 may include a number of different types of I/O circuits. The RAM(s) 590 and programs memories 586 may also be implemented as semiconductor memories, magnetically readable memories, and/or optically readable memories, for example.

The client device terminals 582 may include a display 596, a controller 597, a keyboard 598 as well as a variety of other input/output devices (not shown) such as a scanner, printer, mouse, touch screen, track pad, track ball, isopoint, voice recognition system, digital camera, etc. Each client device terminal 582 may be signed onto and occupied by an employee to assist them in performing their duties or by an owner to complete a mortgage application. Employees and/or owners may sign onto a client device terminal 582 using any generically available technique, such as entering a user name and password. If an employee is required to sign onto a client device terminal 582, this information may be passed via the link 584 to the agent server 536, so that the controller 580 will be able to identify which employees are signed onto the system and which client device terminals 582 the employees are signed onto. This may be useful in monitoring the employees' productivity. If an owner signs onto a client device terminal, the owner may be assigned a username and password that may be used to record usage data and/or payment data.

Typically, agent servers 536 store a plurality of files, programs, and other data for use by the client device terminals 582 and the network computer 530. One agent server 536 may handle requests for data from a large number of client device terminals 582. Accordingly, each agent server 536 may typically comprise a high end computer with a large storage capacity, one or more fast microprocessors, and one or more high speed network connections. Conversely, relative to a typical agent server 536, each client device terminal 582 may typically include less storage capacity, a single microprocessor, and a single network connection.

Figure 6:
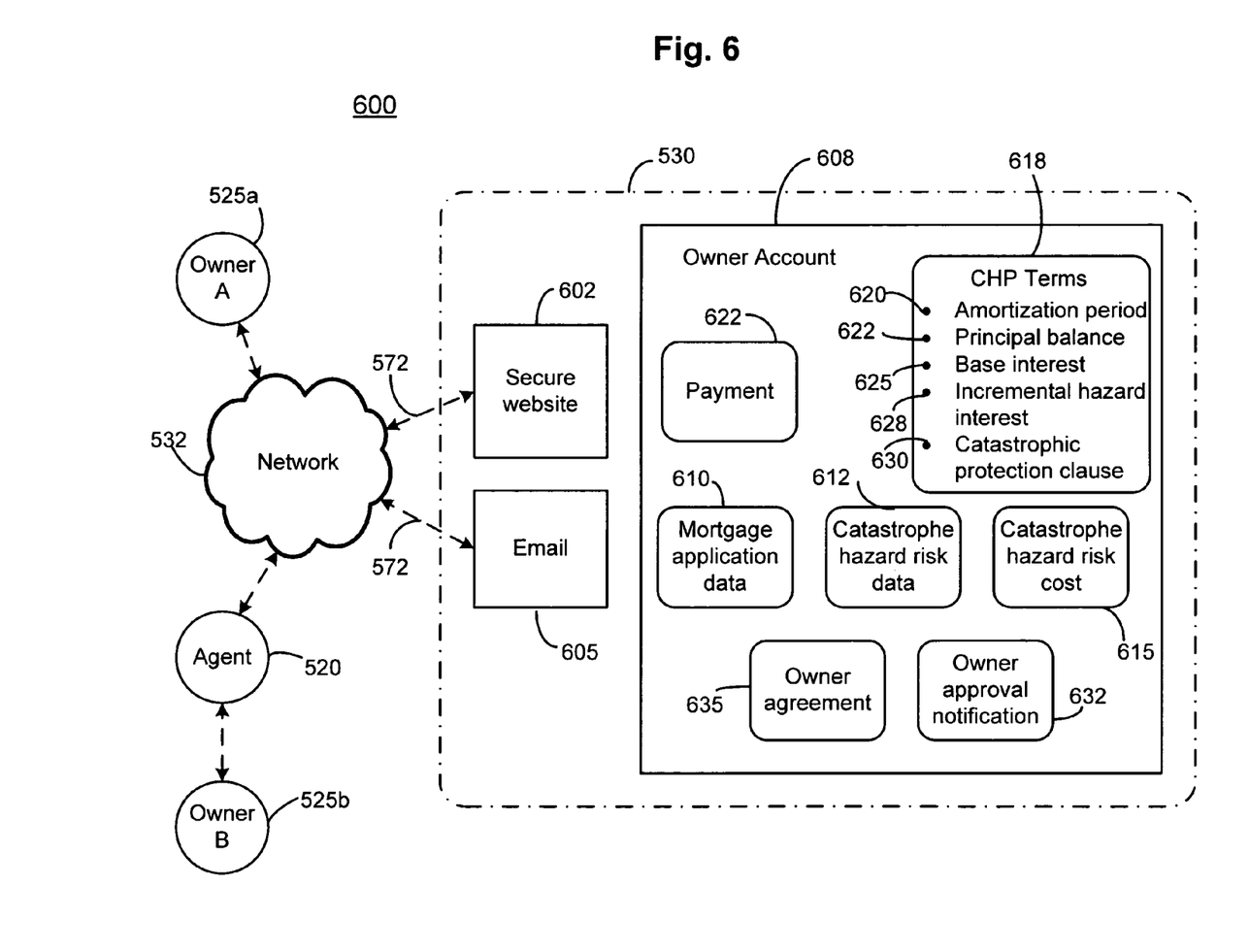
FIG. 6 is an exemplary method of providing catastrophic loss protection by augmenting an existing mortgage.

FIG. 6 illustrates an exemplary architectural embodiment 600 at a network computer 530 for electronically implementing the method 100 of providing catastrophic hazard protection on a mortgage. The network computer 530 may be similar to that of FIG. 5a, and it may be connected through a network 532 to one or more owners 525a and agents 520, as depicted in FIG. 5. Alternately, an owner of a property 525b may also access the network computer 530 via an agent 520. Access to the network computer 530 may be provided by a secure website 602, via email 605, a combination of the two, or by some other electronic means. An owner account 608 may be created and stored at the network computer 530 in the database 552. The owner may electronically apply for a CHP mortgage by sending mortgage application data 610 to the network computer 530. The mortgage application data 610 is then associated with the owner account 608. Next, a set of catastrophe hazard risk data 612 may be obtained using link 572 through network 532 to receive the data via email, website access, or other electronic transfer means from a database, another business entity, or other party. Alternatively, an agent 520 may enter or copy the data 612 directly into computer 530. The catastrophe hazard risk data 612 may also associated with the owner account 608, and may be used along with the mortgage application data 610 to obtain a catastrophe hazard risk cost 615. The catastrophe hazard risk cost 615 may be calculated at the network computer 530, or it may be obtained via query, email, website or some other electronic means over link 572 through network 532 from another business entity, database, or other party. The catastrophe hazard risk cost 615 may also be associated with the owner account 608.

A set of terms 618 for the CHP mortgage may be determined based upon the mortgage application data 610 and the catastrophe hazard risk cost 615. These terms 618 may include typical mortgage terms used in the art such as but not limited to amortization period 620, principal amount 622, and base interest rate 625. The terms 618 may also include parameters associated with catastrophic hazard protection such as but not limited to an incremental hazard interest rate 628 and a catastrophic hazard protection clause 630. (The terms 618, their definitions, and their uses are consistent with the description provided in method 100 above.) The terms 618 may also be associated with the owner account 608.

An electronic approval notification 632 may be received over link 572 signifying that the owner has been approved for the catastrophic hazard protection mortgage, and the notification 632 may be associated with the owner account 608. An electronic owner agreement 635 to the set of terms 618 may be sent to the owner, and an electronically signed copy of the agreement 635 may be received via link 572 through the secure website 602 or email 572. The electronic agreement 635 may then be associated with the owner account 608.

Electronic payments 638 towards the CHP mortgage may be received at the network computer 530 via electronic transfer, and the payment 638 may be apportioned towards the principal balance 622, the base interest 625, and the incremental hazard interest 628. Maintenance of the owner account 608 at the network computer 530 may enable the owner to view the terms 618, current principal balance 622, record of payments, and other such data regarding the account via the secure website 602 and/or email 605. Correspondence regarding the owner account 608, including statements, notices, updates, and the like, may be provided from the network computer 530 via posting on the secure website 602 or via email 605. Correspondence to and information exchange with third parties, such as but not limited to business entity partners sharing in the steps and/or profits of the method 100, investors, contractors, and the like, may also be performed via the secure website 602 and/or email 605 via link 572 through network 532.

In the embodiment where an owner 525b may access the network computer 630 via an agent 520 or a computer of the agent 520, the agent 520 may administer password and other security precautions for website 602, email 605, and/or owner account 608 access. The owner record may be maintained at the network computer 530, at a server 536 of the agent as depicted in FIG. 5, at both locations, or some combination of the two. Steps of the method 100 may be performed by the network computer 530, at a server of the agent 536, at a computer of the agent as depicted by FIG. 5b, or some other division of labor across a combination of the devices.

Figure 7:
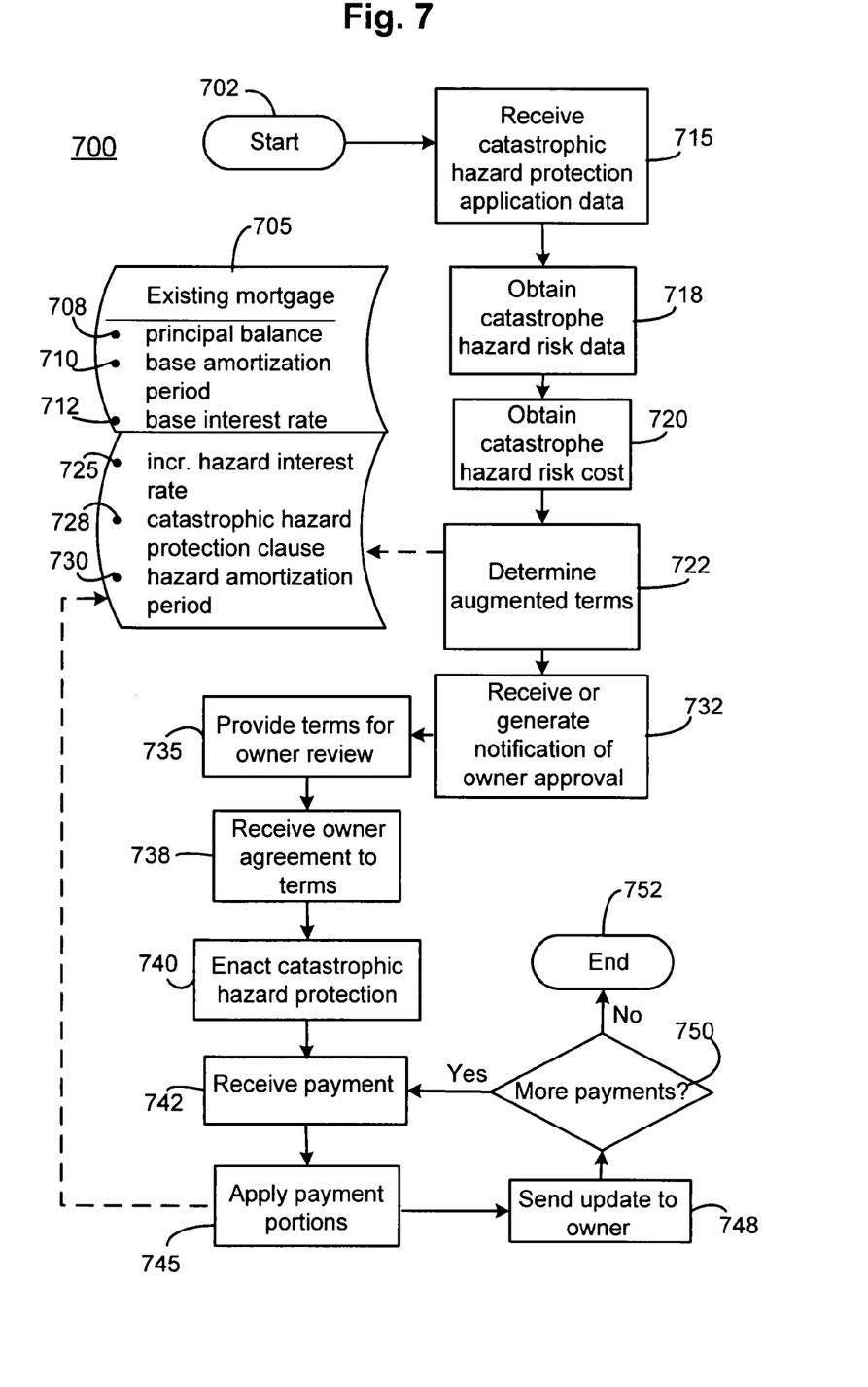
FIG. 7 is an exemplary method of providing catastrophic hazard protection via an existing mortgage on a real property of an owner.

FIG. 7 illustrates an embodiment of a method 700 for providing catastrophic hazard protection via an existing mortgage on a real property of an owner. In this embodiment, the mortgage may have already been enacted and the mortgage broker, bank, insurance agent, or other business entity may implement this method 700 by augmenting the existing mortgage. The business entity that implements this embodiment 700 may be the same business entity that holds the mortgage on the property, it may be a separate business entity, or a combination of several business entities. This embodiment 700 may be implemented, for example, if an owner has been dropped from a catastrophic hazard insurance policy or if a business entity wishes to break into an existing market of mortgage holders. This "add-on" or "augmented" method 700 of adding catastrophic hazard protection to a mortgage may or may not be implemented electronically, and may be implemented with or without an agent as an owner interface.

At the start (block 702), a property owner may have an existing mortgage 705 on real property with a principal balance 708, and a base amortization period 710 and a base interest rate 712. The property may be residential or it may be commercial, and may include land and one or more structures. Catastrophic hazard protection application data may be received (block 715) that may include information typically used in the art to underwrite mortgages such as the owner's financial data, proposed hazard amortization period, proposed incremental hazard interest rate and other information. Next, catastrophe risk data may be obtained (block 718) corresponding to the property. The catastrophe risk data may apply to the one or more structures on the property, and may include the structure type, replacement cost, address, year built, square footage, construction type, a building cost inflation index, and a measure of owner risk retention in loss scenarios. Other catastrophe risk data in addition to these parameters may also be obtained.

A catastrophe hazard risk cost of the property may be obtained (block 720) via calculation, from another entity, or by some other means. The catastrophic hazard protection application data and the catastrophe hazard risk cost may be used to determine a set of augmented terms (block 722) for the purposes of catastrophic hazard protection, including an incremental hazard interest rate 725 and a catastrophic hazard protection clause 728. The definitions, determination, and uses of these terms 725, 728 may be similar to those of method 100. A hazard amortization period 730 may also be determined over which the catastrophic hazard protection may apply, that may be the same duration as the base amortization period 710 or it may be different.

Notification that the owner has been approved for the CHP add-on may be received (block 732), and the augmented terms 725, 728, 730 may be provided to the owner for review (block 735). Upon reception of owner agreement to the terms (block 738), the CHP add-on to the existing mortgage may be enacted (block 740). Payments may be received (block 742) and apportioned (block 745) across principal balance 708, base interest 712, and hazard interest 725 according to the terms of the original mortgage 705 and the CHP add-on 725, 728, 730. Updates may be provided to the owner (block 748). Throughout the lifetime of the hazard amortization period 730, if the mortgage has not been paid off as determined at block 750, payments from the owner may continue to be received (block 742) and applied (block 745). When the hazard amortization period 730 has been completed, the method 700 may end (block 752).

As in the previous embodiments, providing catastrophic hazard protection via an augmented mortgage 700 may be implemented with the use of an agent to interface with the owner. The method 700 may also be implemented electronically, similar to that as described earlier in the description of FIG. 6.

The invention has been described in terms of several preferred embodiments. It will be appreciated that the invention may otherwise be embodied without departing from the fair scope of the invention defined by the following claims.

What is claimed:

1. A method of electronically providing a catastrophic hazard protection mortgage on a real property of an owner, comprising:

storing a computer program on a machine-accessible storage medium of at least one computing device; and     executing the computer program by a processor of the at least one computing device, including:

electronically creating an owner account associated with the owner and the real property, the real property being at least one of a residential real property or a commercial real property;

electronically receiving a set of mortgage application data associated with the owner, including electronically receiving at least one of owner financial data, a loan amount, a loan period, or a loan type;

associating the set of mortgage application data with the owner account;

obtaining a set of catastrophe hazard risk data for a structure of the real property, including electronically obtaining at least one of a structure type, a structure replacement cost, a structure address, a structure year built, a structure square footage, a structure construction type, a building cost inflation index, or a measure of owner risk retention in loss scenarios;

obtaining a catastrophe hazard risk cost of the real property;

associating the catastrophe hazard risk data and the catastrophe hazard risk cost with the owner account;

using the processor to determine a set of terms for the catastrophic hazard protection mortgage based upon the set of mortgage application data and the catastrophe hazard risk cost, the set of terms including at least a principal balance, a base interest rate, an incremental hazard interest rate corresponding to the catastrophe hazard risk cost, an amortization period, and a catastrophic hazard protection clause, wherein the catastrophic hazard protection clause includes an agreement to provide the owner with a reduction in the principal balance if a catastrophic hazard occurs resulting in damage to the real property during a lifetime of the catastrophic hazard protection mortgage;

associating the set of terms with the owner account;

associating an electronic approval notification with the owner account;

electronically providing the set of terms for owner review;

electronically receiving an owner agreement indicating that the owner agreed to the set of terms;

associating the owner agreement with the owner account;

enacting the catastrophic hazard protection mortgage in accordance with the set of terms;

applying a first portion of at least one payment toward the principle balance;

applying a second portion of the at least one payment toward a base interest amount, the base interest amount corresponding to the base interest rate;

applying a third portion of the at least one payment toward a hazard interest amount, the hazard interest amount corresponding to the incremental hazard interest rate; and allocating the second and the third portions of the at least one payment to a bank, a mortgage lender, an insurance company, a mortgage licensee, one or more business entities, or a combination thereof.

2. The method of claim 1, wherein executing the computer program by the processor of the at least one computing device further includes:

electronically receiving the at least one payment from the owner; and electronically providing an updated statement to the owner.

3. The method of claim 2, further comprising initiating an execution of at least a portion of the computer program via a user interface of the at least one computing device that is accessible to an employee of: the bank, the mortgage lender, the insurance company, the mortgage licensee, the one or more business entities, or the combination thereof.

4. The method of claim 1, wherein:

electronically providing the set of terms for owner review comprises one of sending send the set of terms via email or posting the set of terms to a secure website, electronically receiving the set of mortgage application data comprises receiving the set of mortgage application data via email or receiving the set of mortgage application data via input at the secure website, and electronically receiving the owner agreement comprises receiving the owner agreement via email or receiving the owner agreement via input at the secure website.

5. The method of claim 1, wherein if a catastrophic hazard occurs resulting in damage to the structure of the real property, executing the computer program further comprises:

one of generating or receiving information associated with a value of damage corresponding to the damage to the structure of the real property, determining a lesser amount of the principal balance and the value of damage, one of reducing the principal balance by the lesser amount or paying the owner the lesser amount, and electronically providing a revised principal balance to the owner; and wherein if at least one of a group of non-catastrophe hazards occurs resulting in damage to the structure of the real property, the group including a fire hazard and a flood hazard, and if the owner maintains a non-catastrophe hazard insurance policy on the real property, executing the computer program further comprises retaining the principal balance.

6. The method of claim 1, wherein enacting the catastrophic hazard protection mortgage for the real property comprises:

enabling a secure website to provide the owner a view of the owner account, the view including the set of terms, a current principal balance, a record of payments, a record of base interest amounts paid, and a record of hazard interest amounts paid;

enabling the secure website to allow the owner to make payments via electronic transfer; and enabling the owner to electronically receive via one of email or accessing the secure website a correspondence regarding the owner account, the correspondence including at least one of a statement, a notice, a status or a revision.

7. The method of claim 6, wherein executing the computer program further comprises administrating owner password and owner access security permissions of the secure website.

8. The method of claim 1, wherein executing the computer program further comprises securitizing the catastrophe hazard risk cost of the real property with an asset-backed security investor, electronically updating the asset-backed security investor with a status of the catastrophic hazard protection mortgage, and creating a hedging strategy to mitigate an increased financial risk corresponding to the catastrophic hazard protection clause.

9. A system for electronically providing a catastrophic hazard protection mortgage on a real property of an owner, comprising:

at least one computing device communicatively coupled to a network and including a machine-accessible storage medium, a processor, and a program stored on the machine-accessible storage medium and executable by the processor to:

electronically create an owner account associated with the owner and the real property, the real property being at least one of a residential real property or a commercial real property;

electronically receive a set of mortgage application data associated with the owner, the set of mortgage application data including at least one of owner financial data, a loan amount, a loan period, or a loan type;

associate the set of mortgage application data with the owner account;

obtain a set of catastrophe hazard risk data for a structure of the real property, the set of catastrophe hazard risk data including at least one of a structure type, a structure replacement cost, a structure address, a structure year built, a structure square footage, a structure construction type, a building cost inflation index, or a measure of owner risk retention in loss scenarios;

obtain a catastrophe hazard risk cost of the real property;

associate the catastrophe hazard risk data and the catastrophe hazard risk cost with the owner account;

determine a set of terms for the catastrophic hazard protection mortgage based upon the set of mortgage application data and the catastrophe hazard risk cost, the set of terms including at least a principal balance, a base interest rate, an incremental hazard interest rate corresponding to the catastrophe hazard risk cost, an amortization period, and a catastrophic hazard protection clause, wherein the catastrophic hazard protection clause includes an agreement to provide the owner with a reduction in the principal balance if a catastrophic hazard occurs resulting in damage to the real property during a lifetime of the catastrophic hazard protection mortgage;

associate the set of terms with the owner account;

associate an electronic approval notification with the owner account;

electronically provide the set of terms for owner review;

electronically receive an owner agreement indicating that the owner agreed to the set of terms;

associate the owner agreement with the owner account;

enact the catastrophic hazard protection mortgage in accordance with the set of terms;

electronically receive at least one payment from the owner, the at least one payment including a first portion to be applied toward the principal balance, a second portion to be applied toward a base interest amount corresponding to the base interest rate, and a third portion to be applied toward a hazard interest amount corresponding to the incremental hazard interest rate;

apply the first, second, and third portions of the at least one payment toward the principal balance, the base interest amount, and the hazard interest amount, respectively;

allocate the second and the third portions of the at least one payment to a bank, a mortgage lender, an insurance company, a mortgage licensee, one or more business entities, or a combination thereof; and electronically provide an updated statement to the owner.

10. The system of claim 9, wherein the at least one computing device further includes a user interface, and wherein an execution of at least a portion of the program is initiated via the user interface.

11. The system of claim 9, wherein:

the program being executable to electronically provide the set of terms for owner review comprises the program being executable to one of send the set of terms via an email capability or post the set of terms to a secure website, the program being executable to receive the set of mortgage application data comprises the program being executable to one of receive the set of mortgage application data via the email capability or receive the set of mortgage application data via input at the secure website, and the program being executable to electronically receive the owner agreement comprises one of the program being executable to receive the owner agreement via the email capability or to receive the owner agreement via input at the secure website, the secure website includes a correspondence capability to send and receive a correspondence regarding the owner account, an electronic payment capability, and access to the owner account, including access to the set of terms, a current principal balance, a record of payments, a record of base interest amounts paid, and a record of hazard interest amounts paid;

the email capability includes a capability to send email to and receive email from the owner, the sent or received email including the correspondence regarding the owner account, and the correspondence regarding the owner account includes at least one of a statement, a notice, a status or a revision.

12. The system of claim 9, wherein if a catastrophic hazard occurs resulting in damage to the structure of the real property, the program is further executable by the processor to:

one of generate or receive information associated with a value of damage corresponding to the damage to the structure of the real property, determine a lesser amount of the principal balance and the value of damage, one of reduce the principal balance by the lesser amount or pay the owner the lesser amount, and electronically provide a revised principal balance to the owner; and wherein if at least one of a group of non-catastrophe hazards occurs resulting in damage to the structure of the real property, the group including a fire hazard and a flood hazard, and if the owner maintains a non-catastrophe hazard insurance policy on the real property, the program is further executable by the processor to retain the principal balance.

13. The system of claim 9, wherein the program is further executable by the processor to securitize the catastrophe hazard risk cost of the real property with an asset-backed security investor and electronically update the asset-backed security investor with a status of the catastrophic hazard protection mortgage, and create a hedging strategy to mitigate an increased financial risk corresponding to the catastrophic hazard protection clause.

14. A machine-accessible storage medium comprising:

a first program stored thereon for electronically providing a catastrophic hazard protection mortgage on a real property of an owner, the first program executable to:

electronically create an owner account associated with the owner and the real property, the real property being at least one of a residential real property or a commercial real property;

electronically receive a set of mortgage application data associated with the owner, the set of mortgage application data including at least one of owner financial data, a loan amount, a loan period, or a loan type;

associate the set of mortgage application data with the owner account;

obtain a set of catastrophe hazard risk data for a structure of the real property, the set of catastrophe hazard risk data including at least one of a structure type, a structure replacement cost, a structure address, a structure year built, a structure square footage, a structure construction type, a building cost inflation index, or a measure of owner risk retention in loss scenarios;

obtain a catastrophe hazard risk cost of the real property;

associate the catastrophe hazard risk data and the catastrophe hazard risk cost with the owner account;

determine a set of terms for the catastrophic hazard protection mortgage based upon the set of mortgage application data and the catastrophe hazard risk cost, the set of terms including at least a principal balance, a base interest rate, an incremental hazard interest rate corresponding to the catastrophe hazard risk cost, an amortization period, and a catastrophic hazard protection clause, wherein the catastrophic hazard protection clause includes an agreement to provide the owner with a reduction in the principal balance if a catastrophic hazard occurs resulting in damage to the real property during a lifetime of the catastrophic hazard protection mortgage;

associate the set of terms with the owner account;

associate an electronic approval notification with the owner account;

electronically provide the set of terms for owner review;

electronically receive an owner agreement indicating that the owner agreed to the set of terms;

associate the owner agreement with the owner account;

enact the catastrophic hazard protection mortgage in accordance with the set of terms;

apply a first portion of at least one payment toward the principle balance;

apply a second portion of the at least one payment toward a base interest amount, the base interest amount corresponding to the base interest rate;

apply a third portion of the at least one payment toward a hazard interest amount, the hazard interest amount corresponding to the incremental hazard interest rate;

allocate the second and the third portions of the at least one payment to a bank, a mortgage lender, an insurance company, a mortgage licensee, one or more business entities, or a combination thereof; and a second program executable to provide a user interface via which an execution of at least a portion of the first program is initiated.

15. The machine-accessible storage medium of claim 14, wherein the first program is further executable to:

electronically receive the at least one payment from the owner; and electronically provide an updated statement to the owner.

16. The machine-accessible storage medium of claim 14, wherein the first program is further executable to provide at least one of an email capability, a secure website, or an owner user interface corresponding to the owner account.

17. The machine-accessible storage medium of claim 14, wherein if a catastrophic hazard occurs resulting in damage to the structure of the real property, the first program is further executable by the processor to:

one of generate or receive information associated with a value of damage corresponding to the damage to the structure of the real property, determine a lesser amount of the principal balance and the value of damage, one of reduce the principal balance by the lesser amount or pay the owner the lesser amount, and electronically provide a revised principal balance to the owner; and wherein if at least one of a group of non-catastrophe hazards occurs resulting in damage to the structure of the real property, the group including a fire hazard and a flood hazard, and if the owner maintains a non-catastrophe hazard insurance policy on the real property, the first program is further executable by the processor to retain the principal balance.

18. The machine-accessible storage medium of claim 14, wherein the first program is further executable by the processor to securitize the catastrophe hazard risk cost of the real property with an asset-backed security investor and electronically update the asset-backed security investor with a status of the catastrophic hazard protection mortgage, and create a hedging strategy to mitigate an increased financial risk corresponding to the catastrophic hazard protection clause.

* * * * *